United States Patent
Payne et al.

(10) Patent No.: US 8,728,605 B2
(45) Date of Patent: May 20, 2014

(54) WATER VAPOR PERMEABLE MULTI-LAYER THERMAL INSULATION

(75) Inventors: John Payne, Lancashire (GB); Leslie James Squires, Blairgowrie (GB)

(73) Assignee: Hunt Technology Limited, Rickmansworth, Hertfordshire (GB)

( * ) Notice: Subject to any disclaimer, the term of this patent is extended or adjusted under 35 U.S.C. 154(b) by 321 days.

(21) Appl. No.: 13/254,875

(22) PCT Filed: Mar. 8, 2010

(86) PCT No.: PCT/GB2010/000407
§ 371 (c)(1),
(2), (4) Date: Nov. 3, 2011

(87) PCT Pub. No.: WO2010/100440
PCT Pub. Date: Sep. 10, 2010

(65) Prior Publication Data
US 2012/0141719 A1    Jun. 7, 2012

(30) Foreign Application Priority Data
Mar. 6, 2009    (GB) .................... 0903963.7

(51) Int. Cl.
*E04B 1/78*    (2006.01)
(52) U.S. Cl.
USPC ......... 428/74; 428/68; 428/308.4; 428/310.5; 428/317.5
(58) Field of Classification Search
USPC ............... 428/74, 308.4, 310.5, 317.5, 68
See application file for complete search history.

(56) References Cited

U.S. PATENT DOCUMENTS

2008/0032114 A1    2/2008    Squires et al.

FOREIGN PATENT DOCUMENTS

| DE | 20 2006 001 050 U1 | 7/2007 | |
|---|---|---|---|
| EP | 1 529 895 A1 | 5/2005 | |
| FR | 2 673 159 | 2/1992 | |
| GB | 1 396 426 A | 4/1972 | |
| GB | 244 8469 A | 10/2008 | |
| GB | 2 449 985 A | 12/2008 | |
| GB | 245 2059 A | 2/2009 | |
| GB | 2452059 A * | 2/2009 | ................ C08J 7/04 |
| WO | 01 23125 A2 | 4/2001 | |
| WO | WO 2006043092 A1 * | 4/2006 | ............. B32B 27/12 |
| WO | 2008/087011 A1 | 7/2008 | |

OTHER PUBLICATIONS

International Search Report, Application PCT/GB2010/000407, Filing Date Mar. 8, 2010, Applicant: Hunt Technology Limited, 11 pages.
International Preliminary Report on Patentability, Application PCT/GB2010/000407, Filing Date Mar. 8, 2010, Applicant: Hunt Technology Limited, 6 pages.

* cited by examiner

*Primary Examiner* — Brent O'Hern
(74) *Attorney, Agent, or Firm* — Dinsmore & Shohl LLP

(57) ABSTRACT

A water vapor permeable multi-layer thermal insulation (10) includes two water vapor permeable outer layers (16, 18) encapsulating inner air and water vapor permeable layers (14) of insulation material and at least one inner separating layer (12) of an air-open fibrous material interleaved with the inner thermal insulation layers (14) and having a mean flow pore size that allows water vapor to move from one side of the at least one inner fibrous separating layer to the other and through the inner insulation layers yet restricts mass movement of air from one side to the other of the at least one inner fibrous separating layer (12) to form a barrier to convection.

23 Claims, 1 Drawing Sheet

WATER VAPOR PERMEABLE MULTI-LAYER THERMAL INSULATION

Figure 1:
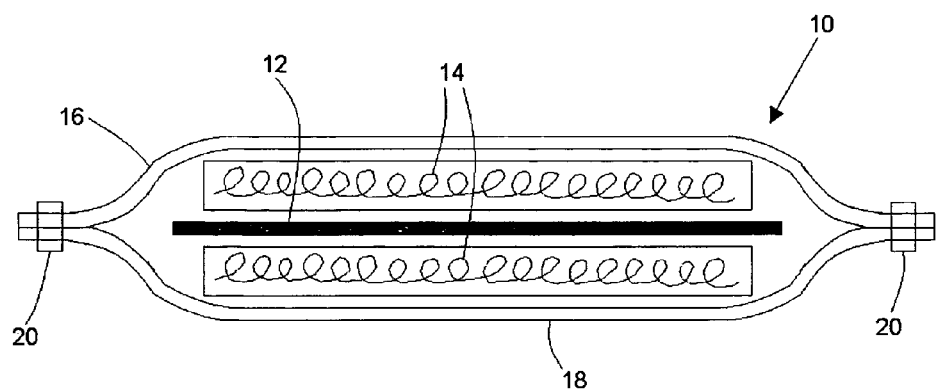

The present invention relates to water vapour permeable thermal insulation including a multiplicity of layers, more particularly, but not exclusively, for use in the construction industry, for example in buildings.

The majority of insulation materials are not water vapour permeable. For example rigid polyurethane or polyisocyanate boards faced with aluminium foil have a very high water vapour resistance. Other rigid materials such as polystyrene boards also have significant water vapour resistances.

Flexible insulation products, such as multi-layer thermal insulation, including multiple separating layers of film made from water vapour impermeable materials such as aluminium foil or aluminised polypropylene film alternating with so-called "spacer" thermal insulation layers are known by the term "multi-foil insulation". Even though the spacer insulation materials used in multi-foil insulation may be water vapour permeable, such as fibrous wadding, or air impermeable, such as closed cell foam or bubble wrap, the multi-foil insulation, as a whole, is water vapour impermeable.

By contrast, thermal insulation which is based on fibrous materials such as glass, mineral or cellulosic fibres or cellulose balls and which do not have a reflective (low emissivity) surface is generally highly water vapour permeable.

Insulation materials which are installed on the outside of other insulation are described as being on the "cold-side" of a structure say a building, in temperate climes. The temperature through a building drops in proportion to the thermal resistance of the materials used. Insulation installed on the "cold-side" is at a lower temperature than that of the interior of the building, e.g. a house. This insulation must be sufficiently permeable to allow any water vapour reaching it to pass through to the outside as otherwise water vapour will condense on the surface of the insulation. Condensation of water vapour inside a building causes many problems, including growth of fungi, rotting of timbers, generation of odours and a reduction in the performance of the thermal insulation. It is clearly desirable for such "cold-side" insulation to be as permeable as possible to minimize the risk of condensation.

Installing insulation on the "cold-side" of the already installed insulation is in principle a very useful method for upgrading the insulation of an existing building. Many older buildings have inadequate levels of insulation that fall below modern standards of energy efficiency. Upgrading such buildings to current insulation standards would save energy, reduce fuel bills and cut $CO_2$ emissions. One simple way to upgrade insulation in a roof is to remove the outer roof covering (tiles, slates), install insulation above the existing roof structure, then re-fix the outer covering. The advantage of this method is that the interior of the building is not disturbed. If the inside of the roof of a building is used as a living space (e.g. a room in a roof or a loft conversion) then fitting additional insulation inside the existing roof structure would reduce living space and cause a great deal of mess and inconvenience. However, adding additional insulation from the outside is only realistic if that additional insulation is sufficiently water vapour permeable to prevent condensation.

Another simple method of upgrading the insulation in an existing building, where roof insulation is installed at ceiling level between or above the joists in the loft or attic, is to fit further insulation below the rafters. This transforms the roof from a cold ventilated or non-ventilated roof system into a warm, non-ventilated roof, thereby boosting the thermal and energy performance, and improving the airtightness of the roof. Again, adding additional insulation below the rafters above existing insulation is only possible if that additional insulation is sufficiently water vapour permeable to prevent condensation.

Known water vapour permeable insulation such as glass wool has poor thermal efficiency. To insulate a building using glass wool requires a large thickness of glass wool, necessitating raising the height of the roof considerably. In addition, air movement across and through fibrous insulation materials significantly lowers their thermal performance.

Many insulation materials require the inclusion of a water vapour barrier or water vapour control layer on the inside of the insulation material to prevent or reduce water vapour migrating to a cold surface where it will condense. Accordingly, in order to vent adequately the water vapour generated by the occupants of a building, artificial ventilation in the form of mechanical vents, trickle vents or extract fans is needed. Unless a heat exchanger is fitted, artificial ventilation also allows warm air to escape, thereby increasing energy consumption and carbon emissions. Actually, it is more energy-efficient to allow water vapour to escape from a building through water vapour permeable materials than by artificial ventilation, which also results in the loss of warm air.

The thermal properties of multi-foil insulation mentioned previously are improved by employing relatively thick air and water vapour permeable (air-open) or impermeable (air-closed) spacer insulation layers of material of low thermal conductivity (such as non-woven fibrous wadding, closed cell foam, bubble wrap or 3D knitted fabrics) and by interleaving the spacer insulation layers with inner air and water vapour impermeable (air-closed) separating layers such as films or foils. The films or foils prevent air movement through the structure and, if of low emissivity, reduce radiant heat loss, thus reducing heat transfer through the multi-foil insulation. This type of multi-foil insulation, especially where the outer layers and the inner separating films have a low emissivity surface, is known to be an efficient thermal insulator. However, because the majority of such multi-foil insulation products are water vapour impermeable, as mentioned previously, they are unsuited for use on the "cold-side" of a building structure.

All the prior art relating to multi-foil insulation teaches that films or foils that are continuous, essentially air closed or micro-perforated are required to prevent mass movement of air through the multi-layer insulation and therefore reduce heat losses due to the reduction of convection within the body of the multi-foil insulation. However, it is impossible to form a sufficiently high water vapour permeable multi-layer insulation by any of these methods, even when water vapour permeable films are used, such as micro-porous polypropylene, cellulosic or microperforated films. Multiple layers of such films give a level of water vapour permeability which is of limited practical use.

Some thermal insulation products are stitched in order to hold the multiple layers of a multi-foil insulation together. Although stitching allows a low degree of water vapour permeability, this is not enough to be of great practical use in buildings. In particular, stitching holes do not make the multi-foil thermal insulation sufficiently permeable to allow its use on the "cold-side" of the existing building insulation. Furthermore, stitching holes allow cold air to pass through to the inner face of the multi-foil thermal insulation, thus making the area around the holes cold and therefore a centre for condensation.

Stitched multi-foil insulation materials are described in GB 2 430 208 (Proctor) and WO 08 062 155 (YBS), for example. However, as explained above, although the stitching holes provide some limited water vapour permeability, it is not enough to be useful. Indeed, these stitched multi-foil insulation materials are described as "vapour barriers" (i.e. water vapour barriers), and their installation guidelines recommend that tape be used to cover the stitching holes.

WO 2006/008 351 (Icopal) discloses a breathable (air permeable) thermal insulation product that can be used above existing thermal insulation in the roof of a building. This breathable insulation consists of 5 to 20 mm of fibrous wadding with a thermal conductivity, $\lambda$, of 0.040 W/m·K enclosed between two breathable outer layers which may have reflective surfaces. Whilst being sufficiently breathable to allow use above existing building insulation, the thermal performance of this breathable insulation is poor. The thermal resistance, R, of the central core is only 0.5 m$^2$·K/W and it does not make a significant contribution to the overall roof insulation. This insulation does not include any inner separating layers that would break the fibrous wadding into thinner layers. The drawbacks of omitting inner layers having reflective surfaces is that there is no reflection of infra-red radiation within the central core of material: neither is it possible to increase the thickness of material above 20 mm without forming convection cells which would affect the thermal performance of the product.

Figure 2:
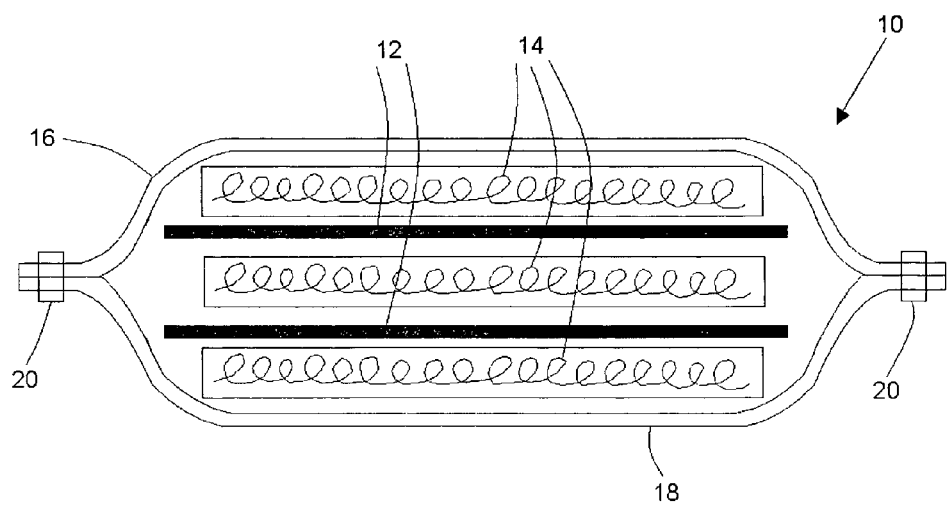

GB 2,432,812 and GB 2,448,469 (Hunt Technology) describe the use of cellulosic based films to provide a breathable multi-layer insulation. FIGS. 1 and 2 of the specifications of GB 2,432,812 and GB 2,448,469 show that the moisture vapour transmission rate, MVTR, decreases severely when several such films are used in the multi-layer insulation. However, increasing the number of reflective inner films to reduce heat flow has the unwanted effect of also reducing the water vapour permeability as will be appreciated from Table 1 of the specifications of GB 2,432,812 and GB 2,448,469. It is difficult with cellulosic films to combine both efficient thermal performance with high vapour permeability. In addition, the high cost of such films makes the multi-layer insulation expensive.

WO 2008/087011 (Kolev) discloses a breathable multi-layer insulation having vapour permeable, water-proof, airtight reflective outer layers and inner reflective water vapour and air permeable micro-perforated foils, with the perforations having a diameter in the range 50 to 2000 µm, interposed between air and water vapour permeable insulation layers. Whilst the reflective surfaces of the micro-perforated films reduce radiation losses, the perforations are too large to prevent mass air movement and convection currents being formed. Further, the water vapour permeability of micro-perforated foils is known to be low. The effect of using several micro-perforated foils results in a multi-layer insulation having low breathability.

GB 371,846 (Todd et al.) relates to insulating panels made of rigid frames with inner compartments formed of layers of woven materials, such as of cotton, wool or silk, or paper. However, these insulating panels are not flexible and are therefore difficult to use and install and their constituent materials are not reflective and can have no effect in reducing radiation heat losses.

Reflective and breathable roofing underlays are described in the specification of GB 2,388,815 (Don & Low) using microperforated films and include the replacement of the microperforated films by reflective nonwoven material (reflective masterbatch) which is presented as outside layers of the underlays and so does not act as a convection barrier.

GB 2,449,985 (Hunt) relates to a thermal insulation structure for buildings, having securing flaps for ease of positioning and securing the insulation structure to adjacent supporting members such as rafters, wall studs or floor joists and enables compensation for variations in the width of the space between the supporting members to provide for continuous insulation across the whole of the supporting member without any gaps that would allow air leakage. Woven and nonwoven fabrics are mentioned as components of the insulation structure but their specific role is not stated. Inner separating films are specified as being water vapour permeable, e.g. microporous films, microperforated films or regenerated cellulose films, or as being water vapour impermeable.

GB 2,452,059 (Hunt) describes a breathable insulation having a reflective coating on inner and outer layers and nonwoven materials, used as support layers only, laminated to the reflective layers.

U.S. Pat. No. 4,696,138 (Bullock) discloses the use of discrete inner layers of particulate insulation and outer layers of water vapour permeable plastic membrane or film that isolate the insulation layers substantially to prevent air from circulating through the insulation layers while allowing moisture to migrate through the insulation layers without collecting therein and damaging the insulation.

JP 2004285611 discloses a heat insulation and humidity conditioning material used for e.g. a wall, a floor or a ceiling of a building to ensure energy saving and includes a base material, an intermediate layer of porous silica gel with binary pores of different sizes and a moisture permeable outer surface layer and/or a ventilating part.

Reflective and breathable roofing underlays are also marketed under the trade mark Enercor™ by DuPont. However, these roofing underlays consist of a single layer only and have no intrinsic insulating properties other than increasing the thermal resistance of the adjacent air space.

A breathable insulating roofing underlay is commercialised by Dorken GmbH under the trade mark Delta-Maxx Comfort™ and consists of a breathable underlayer based on a polyurethane film bonded to 30 mm of polyester wadding. The thermal performance of this breathable underlay is inefficient, since convection can occur across the whole 30 mm thickness of wadding, with there being no inner layers to prevent air movement and not any reflective components.

It will be appreciated from the foregoing that none of the prior art insulation described above, and in particular a multi-layer insulation, has a thermal efficiency and water vapour permeability that are sufficient to solve the problem of upgrading the energy performance of existing buildings from the outside, i.e. a multi-layer insulation that gives both high thermal performance and high water vapour permeability.

Accordingly, the main object of the present invention is to provide a water vapour permeable multi-layer thermal insulation that overcomes or at least substantially eliminates the above-mentioned disadvantages by giving both high thermal performance and high water vapour permeability.

The Applicant has discovered a principle which is that air-open water vapour permeable fibrous materials, such as woven or non-woven fibrous materials, can nevertheless restrict mass air movement and hence have value as components of insulation materials that minimise heat losses from convection.

To this end and from one aspect, the present invention resides in a water vapour permeable multi-layer thermal insulation including at least one inner layer of an air-open fibrous material having a mean flow pore size that allows water vapour to move from one side of the at least one layer to the other yet restricts mass movement of air from one side to the other of the at, least one layer to form a barrier to convection.

Tests carried out by the Applicant have shown that a mean pore size of 1 to 20 µm for the or each inner layer of air-open fibrous material is consistent with optimising water vapour permeability and minimising convectional heat losses.

Whilst fibrous materials having weights, in the range of 10 to 100 g/m², and mean flow pore sizes in the range of 1 to 20 µm have been used in a variety of applications, for example filtration, where their air openness is an advantage, they have never before been used as convection barriers in insulation, where air openness has always been seen as a disadvantage. In tests carried out by the Applicant, it has been found, surprisingly that materials with a mean flow pore size in the range of 1 to 20 µm act as air-open in applications such as filtration where a high pressure difference exists across the material, but act as air-closed in insulation applications such as in building construction where the pressure difference across the material is much lower.

Air-open materials, such as non-woven fabrics, are more water vapour permeable than continuous materials, such as films, but the Applicant has also found as a result of exhaustive tests, to be referred to, that air-open materials, whilst allowing rapid passage of water molecules, are effective at resisting mass movement of air within and through a multi-layer water vapour permeable thermal insulation.

Thus, it can be said that air-open fibrous materials are "normally" air-open, which is the case in applications, such as filtration, in which air-open fibrous materials have been used prior to the advent of Applicant's invention, but are at least substantially air-closed/air impermeable/restrict mass air flow when used as inner separating layers with insulation materials in a multi-layer water vapour permeable thermal insulation.

In this specification, high thermal performance means a thermal resistance, R, of at least 1.40 m²·K/W obtained when a sample is tested within the measuring chamber of the heat flow meter with 25 mm polystyrene spacers being placed above and below the test sample to create a still air space above and below the sample within the measuring chamber of the heat flow meter. The contribution of the two still air spaces to the overall thermal resistance R can be calculated using the methods given in BS EN 6946. Moreover, in this specification, high water vapour permeability means a moisture vapour transmission rate, MVTR, of at least 1,200 g/m²·day. Furthermore, in this specification, it should be understood that the term "impermeable" as it relates to any of the component layers of a water vapour permeable multi-layer thermal insulation that are stated to be impermeable to air, water vapour or liquid-water includes within its ambit "substantially impermeable".

Accordingly, from another aspect, the present invention resides in a water vapour permeable multi-layer thermal insulation including two water vapour permeable outer layers encapsulating inner air and water vapour permeable layers of insulation material and at least one inner separating layer of an air-open fibrous material interleaved with the inner insulation layers and having a mean flow pore size that allows water vapour to move from one side of the at least one inner fibrous separating layer to the other and through the inner insulation layers yet restricts mass movement of air from one side to the other of the at least one inner fibrous separating layer to form a barrier to convection, the multi-layer thermal insulation having a moisture vapour transmission rate (MVTR) of at least 1,200 g/m²·day and a thermal resistance (R) of at least 1.40 m²·K/W.

From a further aspect, the present invention resides in a water vapour permeable multi-layer thermal insulation including two water vapour permeable outer layers encapsulating air and water vapour permeable inner layers of insulation material and at least one inner separating layer of an air-open fibrous material interleaved with the inner insulation layers and having a mean flow pore size in the range of 1 to 20 µm that allows water vapour to move from one side of the at least one inner fibrous separating layer to the other and through the inner insulation layers yet restricts mass movement of air from one side to the other of the at least one inner fibrous separating layer to form a barrier to convection, the multi-layer thermal insulation having a moisture vapour transmission rate (MVTR) of at least 1,200 g/m²·day and thermal resistance (R) of at least 1.40 m²·K/W.

By means of the aspects of the invention defined herein, a water vapour permeable multi-layer thermal insulation can be created that provides both high water vapour permeability and high thermal performance.

The actual MVTR and R values will depend upon the materials used and the number of layers, as will be appreciated from certain ones of the accompanying Tables. Thus, in accordance with preferred embodiments of the invention, a water vapour permeable multi-layer thermal insulation may have a MVTR values in the range of 1,200 to 2,500 g/m²·day and R values in the range of 1.40 to 2.00 m²·K/W.

The or each inner fibrous separating layer may be of any suitable material consistent with providing the requisite pore size, for example woven or non-woven fibrous materials which are normally air-open, i.e. highly air porous, but when incorporated in a multi-layer thermal insulation are air impermeable, i.e. reduce mass air movement and minimise heat losses from convection.

Thus, when the air-open fibrous materials are incorporated into a multi-layer water vapour permeable thermal insulation with the air and water vapour permeable inner layers of insulation material, as at least one inner separating layer interleaved with the inner thermal insulation layers and with the two water vapour permeable outer layers encapsulating inner layers, they constitute inner water vapour permeable and air impermeable separating layers, with the inner insulation layers being advantageously of low thermal conductivity, such as air and water vapour permeable waddings, or other suitable fibrous materials.

In accordance with a preferred feature of the invention, the Applicant has found as a result of tests that a narrow window of pore size provides the combination of high water vapour permeability and high thermal resistance for a multi-layer water vapour permeable thermal insulation. In particular, materials with a pore size in the range 1 to 5 µm show unexpectedly high water vapour permeability, whereas materials with pore size 2 to 10 µm show unexpectedly high thermal resistances.

Non-woven fabrics have a distribution of pore sizes and shapes, with meltblown and wet-laid fabrics generally having a more consistent and narrower distribution of sizes than a spunbond non-woven which is the preferred material for use in the present invention. There are various definitions of pore size, and methods of measuring pore size, in the non-wovens industry. In this specification, the term pore size refers to the mean flow pore size as measured by a technique such as liquid porosimetry. However, other definitions of pore size and other measurement techniques are also included.

The inner air-open separating layers may be of any suitable thin material, preferably a material having a thickness of less than 1 mm, with pores in the mean flow pore size range of 1 to 20 µm. This can include woven and non-woven fabrics, made from any fibre and by any technique for forming a non-woven fabric layer suitable for use in multi-layer thermal insulation.

The fibres of the fibrous materials of the or each inner fibrous separating layer may include polyethylene, polypropylene, polyester, polyamide, polyurethane, cotton, viscose, wool, glass, acrylics and fluoropolymers. And suitable non-woven fabrics include, but are not limited to, meltblown (M) and spunbond (S) non-wovens, combinations of spunbond and meltblown fabrics such as SM, SMS and SMMS laminated layered fabrics, hydroentangled, wet-laid, carded or needled fabrics. Lamination of the layers of such fabrics may be by point-bonding, for example adhesive, thermal or ultrasonic bonding or resin-bonding. In order to modify the physical and chemical properties of the non-woven fabric layers, post-processing by any appropriate means such as calendering, Corona discharge or wet finishing may be used.

Advantageously, the fibres of the fibrous materials of the or each inner fibrous separating layer have a diameter in the range of 1 to 50 µm, and more especially in the range of 10 to 30 µm.

Preferably, the weights of the inner fibrous separating fabric layers are in the range of 10 to 100 $g/m^2$, and more especially in the range of 20 to 70 $g/m^2$ but even more especially in the range of 25 to 50 $g/m^2$.

From another aspect, the present invention resides in the use of at least one layer of a fibrous non-woven or woven material in insulation in a building construction, the said at least one layer having fibres with a diameter in the range 1 to 50 µm, a thickness of less than 1 mm, a mean flow pore size in the range of 1 to 20 µm and a weight in the range of 10 to 100 $g/m^2$.

Any number of inner water vapour permeable separating (convection barrier) layers may be used depending on the required thickness of the insulation as a whole for the particular application. However, for relatively thin insulation of 50 mm thickness or less, a suitable number of inner separating (convection barrier) layers is 1 to 5, and preferably 1 to 3.

However, in situations where greater thicknesses of insulation as a whole are desired or necessary, a greater number of interleafed layers will be used in which case the thickness of the insulation may be any value upwards of 50 mm, for example to around 200 mm.

Advantageously, the or each of the inner water vapour permeable fibrous separating (convection barrier) layers has a low emissivity surface. Such low emissivity surfaces can be provided by a coating of a reflective, e.g. metallic substance such as aluminium, or by incorporation of a reflective pigment within the polymer matrix of the fibre or within a coating on the fibres, provided that the coating does not affect the water vapour permeability of the normally air-open inner separating layers.

The person skilled in the art of insulation materials would understand the expression low-emissivity surface to mean "a surface having an emissivity value in the range of 0.05 to 0.5" and this is what the expression means wherever it is used in this specification.

From a still further aspect, the present invention resides in a water vapour permeable multi-layer thermal insulation including two water vapour permeable outer layers encapsulating air and water vapour permeable inner layers of insulation material and at least one inner separating layer of an air-open fibrous material interleaved with the inner insulation layers and having a mean flow pore size in the range of 1 to 20 µm that allows water vapour to move from one side of the at least one inner fibrous separating layer to the other and through the inner insulation layers yet restricts mass movement of air from one side to the other of the at least one inner fibrous separating layer to form a barrier to convection, the or each inner fibrous separating layer having a low emissivity surface that is provided on one or both sides thereof by a reflective metallised coating that coats the fibres of the or each inner fibrous separating layer without blocking the pores between the fibres and the multi-layer thermal insulation having a moisture vapour transmission rate (MVTR) of at least 1,200 $g/m^2 \cdot day$ and thermal resistance (R) of at least 1.40 $m^2 \cdot K/W$.

In order to protect the low emissivity surfaces, a further thin coating of a material that prevents corrosion, oxidation, hydrolysis, scratching or scuffing whilst not having an adverse effect on the emissivity and water vapour permeability may be provided. Such protective layers can include thin films of a polymer such as polypropylene or coatings of a lacquer such as acetate or nitrocellulose.

The metallic coating substance, preferably of aluminium, is conveniently deposited on one or both surfaces of the inner separating layer by plasma deposition which is a well-known process and will therefore not be described in detail herein. The fibres of the or each inner layer are coated without blocking any of the pores, which blocking would reduce, undesirably, the water vapour permeability of the inner layer(s). This metallic coating conveniently provides the or each inner fibrous separating layer with a low emissivity, preferably aluminised, surface on one or both sides.

The inner insulation layers of low thermal conductivity which are interleaved with the at least one inner fibrous separating layer are water vapour permeable and may include fibrous materials such as fibrous wadding and knitted 3D fabrics, or open cell foams and aerogel materials. Conveniently, the fibres of the fibrous materials may be of a synthetic material, such as polyester, polypropylene, polyamide or of a natural material, such as cotton or sheep's wool. Such fibres may be conventional fibres or microfibres and range in diameter from 0.5 to 20 µm, may be hollow with air in the centre, or with multiple holes within the cross-section of the fibre. Furthermore, the cross-section of such fibres may be circular or oval, or of irregular shape such as multi-lobed, to increase the ability to restrict air movement whilst minimising conduction through the body of the fibre. Wadding may be manufactured by thermal bonding, needling, calendering or by any other suitable means. And the wadding may have a density varying from 8 to 40 $kg/m^3$, but is preferably in the range 15 to 33 $kg/m^3$.

In another preferred embodiment of the invention, the water vapour permeable outer layers may be any combination of air-open materials selected from the following: highly air-open materials including woven or non-woven fabrics such as spunbonds or meltblown, combinations of spunbond and meltblown fabrics such as SM, SMS or SMMS structures; slightly air-open materials such as micro-perforated films or foils; continuous materials such as microporous polypropylene (PP), polyurethane, polyester, polyethylene or cellulosic films and laminates thereof.

If the multi-layer water vapour permeable thermal insulation is to be part of the external envelope of the building, then the water vapour permeable outermost layer is preferably liquid-water impermeable (watertight). Suitable water vapour permeable outer layers may be based on a watertight, air impermeable film, for example of polypropylene, polyethylene, polyurethane or of cellulosic films. The water vapour permeable outer layers may be metallised, e.g. aluminised, to provide one or both sides of the or each outer layer with a surface of low emissivity (as previously explained), for example a metallised microporous polypropylene (PP) film as described in the specification of EP 1 930 363. The metallisation may be protected by a thin film of polymer or lacquer. If the multi-layer water vapour permeable thermal insulation is not part of the external envelope of the building, then the water vapour permeable outer layers do not need to be liquid-water impermeable (watertight). For example, if the insulation is installed inside an existing roof structure the water vapour permeable outer layers do not need to be liquid-water impermeable (watertight).

One or more layers of the multi-layer water vapour permeable thermal insulation of this invention may be used in the construction industry, e.g. in a building with other known materials in order to provide a building element with the required thermal, acoustic and structural properties. It is important that a condensation risk analysis demonstrates there is no risk of surface or interstitial condensation in the building element.

Other known materials can be used with the multi-layer water vapour permeable thermal insulation according to the invention. These known materials include insulation materials such as glass or mineral wool, rigid insulation boards made of polyurethane or polystyrene, cellulosic fibres or balls, sheep's wool and construction materials including breathable and non-breathable roofing underlays, standard and vapour-check plasterboard, vapour retarding membranes and water vapour control layers.

In order that the invention may be more readily understood, some embodiments thereof will now be described, by way of example, with reference to the accompanying drawings, in which:—

FIG. 1 is a diagrammatic cross-sectional view through one embodiment of a multi-layer water vapour permeable thermal insulation, constructed in accordance with the invention; and FIG. 2 is a diagrammatic cross-sectional view of another embodiment.

In the drawings, the same reference characters are used to designate the same or similar parts.

Referring to FIG. 1, there is shown a multi-layer water vapour permeable thermal insulation which is generally indicated at 10 and which includes two thick air and water vapour permeable inner spacer insulation layers 14 of a fibrous material of low thermal conductivity and one inner water vapour permeable air-open fibrous separating layer 12 interleaved with the insulation layers 14. The inner air-open fibrous separating layer 12 has a pore size that allows water vapour to move from one side of the separating layer 12 to the other and through the inner insulation layers 14 yet restricts mass movement of air from one side to the other of the inner separating layer 12 to form a barrier to convection. The inner thin air-open separating layer 12 (less than 1 mm thick) has a mean flow pore size in the range of 1 to 20 μm.

As will be appreciated from FIG. 1, the inner layers are encapsulated by two (top and bottom) outer layers 16 and 18 of an air-open or air impermeable water vapour permeable material which are sealed together along their oppositely-facing side edges by thermal, ultrasonic, or adhesive bonding, as indicated at 20. The outer layers 16 may be watertight or liquid water permeable depending upon the use of the insulation 10.

The embodiment of FIG. 2 differs from that of FIG. 1 in that there are two inner air-open fibrous separating layers 12 interleaved with three inner insulation layers 14.

The invention will be further explained with reference to the following tests which are given by way of example.

The water vapour permeability, air permeability and thermal resistance of a multi-layer water vapour permeable thermal insulation according to the invention with watertight outer layers has been measured by the Applicant in the following ways.

Water Vapour Permeability (Moisture Vapour Transmission Rate—MVTR)

A test sample consisting of a top (outer) layer of a water vapour permeable, non-reflective, roofing underlay called WEB UV25 and made by Web Dynamics Limited, was joined to a bottom (outer) layer of cellulosic film coated with a gold reflective coating and adhesively laminated to a layer of spunbond 50 g/m$^2$ polypropylene (PP) non-woven material. The gold-coated cellulosic film was of a type specified in the specification of GB 2,432,812B. WEB UV25 roofing underlay consists of 70 g/m$^2$ UV stabilised polypropylene (PP) spunbond fabrics sandwiching a microporous polypropylene (PP) film.

The water vapour permeability of the test sample was measured using a Dansensor Lyssy Automatic Water Vapour Permeability Tester L80-5000 with high permeability cards under the conditions of ASTM E398, 23° C., 100% relative humidity on the damp side of the test sample and 10% on the dry side. The time required for water vapour to diffuse through the test sample and raise the relative humidity on the dry side to 15% was measured, and converted to a MVTR value of 1318 g of water vapour per square meter of product per day (g/m$^2$·day) under these test conditions. Due to the difficulty in mounting thick samples in the test sample holder, these test samples did not contain any spacer insulation layers of low thermal conductivity, e.g. fibrous materials such as wadding, but since these materials have very high water vapour permeability, layers of these materials do not affect the overall water vapour permeability significantly and a comparison of different inner convection barrier materials may be made.

Air Permeability

The air permeability of a similar multi-layer water vapour permeable thermal insulation has been measured using a Textest FX3300 air permeability tester with test pressure of 300 Pa. Results are expressed in liters/dm$^2$·minute.

Thermal Resistance (R)

The thermal resistance, R of a multi-layer water vapour permeable thermal insulation sample was measured in a FOX 314 heat flow meter manufactured by LaserComp of Saugus, Mass., USA. This multi-layer insulation sample was constructed with the same outer layers as in the MVTR tests—WEB UV25 breathable roofing underlay as the top (outer) layer and a bottom (outer) layer of cellulosic film coated with a gold reflective coating and adhesively laminated to a spunbond polypropylene (PP) non-woven layer. Layers of non-woven polyester wadding with a total thickness of 30 mm were inserted between the two top and bottom outer layers. 25 mm polystyrene spacers were placed above and below the test sample to create a still air space above and below the sample within the measuring chamber of the heat flow meter. The thermal resistance of this multi-layer water vapour permeable thermal insulation, with wadding but no other inner convection barrier layers, was measured. The contribution of the two still air spaces to the overall thermal resistance can be calculated using the methods given in BS EN 6946.

The invention will be further explained, by way of example, with reference to the following Tables.

TABLE 1

The MVTR (g/m² · day), air permeability (liters/dm² · minute) and thermal resistance, R (m² · K/W) figures are given in Table 1 for a multi-layer insulation sample with the WEB UV25 top (outer) layer and cellulosic film bottom (outer) layer, inner spacer layers of 30 mm polyester wadding and with one inner separating layer, based on a continuous material such as a film or foil or an open material such as a polypropylene (PP) spunbond or meltblown non-woven fabric. The MVTR measurements were made without the inner spacer layers of polyester wadding as the wadding thickness can make the measurements difficult to perform and in any event the wadding has a negligible effect on the moisture vapour transmission rate. All thermal tests were carried out with a 25 mm unventilated still air space above and below the sample.

| Inner layer | Inner layer type | Pore size of inner separating layer (μm) | MVTR of UV25/inner/Gold (g/m² · day) | Air permeability of inner separating layer (liters/dm² · minute) | R value of UV25/inner/Gold + waddings (m² · K/W) |
|---|---|---|---|---|---|
| None | | | 1300 | Infinite | 1.31 |
| Aluminised PP film | Continuous film | None | 0 | 0 | 1.40 |
| Cellulosic film | Continuous film | None | 1109 | 0 | 1.42 |
| Microperforated aluminised PP film | Perforated film | 100 | 1025 | 10 | 1.42 |
| 50 g aluminised PP spunbond | Fibrous non-woven | 5-10 | 1285 | 183 | 1.42 |
| 70 g aluminised calendered PP meltblown | Fibrous non-woven | 1-5 | 1266 | 13 | 1.44 |

The structure of these samples is:
- Top (outer) layer—WEB UV25 breather membrane;
- 20 mm wadding;
- Inner separating layer;
- 10 mm wadding;
- Bottom (outer) layer of cellulosic film laminated to PP spunbond.

The first line in the table, consisting of WEB UV25 top (outer) layer, cellulosic film bottom (outer) layer, inner layer of 30 mm polyester wadding and with no inner separating layer is the reference sample. This structure gives good MVTR but a poor thermal resistance.

Aluminised PP film is not air or water vapour permeable. When aluminised PP film is inserted into the multi-layer insulation sample as an inner separating layer, the thermal resistance is improved, but the MVTR is reduced to zero. This is typical of existing, known multi-foil insulations. Cellulosic film is moderately water vapour permeable and air-closed. When installed in a multi-layer insulation, there is a good improvement in thermal resistance, but the water vapour permeability is reduced significantly.

Micro-perforated film has low air permeability and when used as the inner separating layer, it is effective at inhibiting air movement, and as expected has a good impact on the R value. However, the MVTR is decreased since the perforations do not allow adequate movement of water vapour.

These three examples of multi-layer insulation samples behave entirely as expected based on their structure and properties.

Spunbond which has been aluminised such that the fibres of the spunbond are coated by the aluminium without blocking the pores is an air-open material with a high air permeability, and, as expected, does not inhibit permeability to water vapour and so the MVTR is good. However, when used in a multi-layer insulation, aluminised spunbond gives a high R value which is unexpected since an air-open material like spunbond should not improve the R value.

Aluminised calendered PP meltblown has a smaller pore size than the spunbond, and air permeability is much lower. When used as an inner separating layer in a multi-layer thermal insulation, it will inhibit air movement, and gives the expected improvement in R value. However, this inner separating layer also shows a high MVTR, which is surprising, since the small pores would be expected to inhibit movement of water vapour.

This goes to show that air-open fibrous materials can nevertheless reduce mass air movement and hence have value as components of multi-layer thermal insulation that minimise heat losses from convection.

A similar effect is observed when two inner normally air-open separating layers are placed inside the multi-layer insulation sample, in the configuration:
- Top (outer) layer—WEB UV25 breather membrane;
- 10 mm inner spacer insulation layer of wadding;
- Inner separating layer;
- 10 mm inner spacer insulation layer of wadding;
- Inner separating layer;
- 10 mm inner spacer insulation layer of wadding;
- Bottom (outer) layer of cellulosic film laminated to PP spunbond.

TABLE 2

MVTR (g/m² · day), air permeability and thermal resistance of a
multi-layer insulation sample with two inner separating layers of variable
pore size and with WEB UV25 top (outer) layer and cellulosic film
bottom (outer) layer. All thermal tests were carried out with a 25 mm
unventilated still air space above and below the sample

| Inner layer | Inner layer type | Pore size of inner separating layer (μm) | MVTR of UV25/inner/Gold (g/m² · day) | Air permeability of inner separating layer (liters/dm² · minute) | R value of UV25/inner/Gold + waddings (m² · K/W) |
|---|---|---|---|---|---|
| None | | | 1300 | Infinite | 1.31 |
| Aluminised PP film | Continuous film | None | 0 | 0 | 1.54 |
| Cellulosic film | Continuous film | None | 820 | 0 | 1.50 |
| Microperforated aluminised PP film | Perforated film | 100 | 809 | 6 | 1.51 |
| 50 g aluminised PP spunbond | Fibrous non-woven | 5-10 | 1226 | 110 | 1.47 |
| 70 g aluminised calendered PP meltblown | Fibrous non-woven | 1-5 | 1287 | 7 | 1.52 |

It will be appreciated from Table 2 that a multi-layer insulation sample with two air-open inner separating layers shows the same effects as those with a single inner separating layer.

Continuous films improve the thermal resistance by preventing air movement, but also remove all water vapour permeability. Microperforated films and continuous cellulosic films also improve thermal resistance but significantly reduce water vapour permeability. Air-open fibrous materials give both high thermal resistance and water vapour permeability.

Multi-layer insulation samples typically have a minimum of two inner separating film layers and can have as many as six. Clearly it is not possible to manufacture a highly water vapour permeable multi-layer insulation sample by using continuous or microperforated films or foils. Open or discontinuous materials such as woven or non-woven fabrics can be used as inner air-open separating layers without having the same adverse effect on MVTR as films or foils.

TABLE 3

MVTR (g/m² · day) of multi-layer insulation samples - examples of the invention - with WEB UV25 top (outer) layer and cellulosic film bottom (outer) layer (NT = not tested).

| Inner separating layer | 0 layers | 1 layer | 2 layers | 3 layers | Pore size of inner separating layer (μm) |
|---|---|---|---|---|---|
| 40 g/m² PP spunbond | 1318 | 1326 | 1312 | 1279 | 5-10 |
| 70 g/m² PP spunbond | 1318 | 1329 | 1233 | 1177 | 5-10 |
| 35 g/m² aluminised PP spunbond | 1290 | 1282 | 1266 | NT | 5-10 |
| 50 g/m² aluminised PP spunbond | 1318 | 1285 | 1226 | 1164 | 5-10 |
| 10 g/m² meltblown PP | 1290 | 1287 | 1279 | 1282 | 2-5 |
| 21 g/m² meltblown PP | 1243 | 1269 | 1279 | 1261 | 2-5 |
| 70 g/m² calendered meltblown PP | 1243 | 1266 | 1287 | NT | 1-5 |

Up to three layers of a 40 g/m² spunbond non-woven polypropylene fabric have no significant effect on the MVTR of the multi-layer construction. However, a heavier 70 g/m² non-woven polypropylene (PP) spunbond does start to reduce the MVTR, though not to the same extent as the films or foils. A 35 g/m² aluminised polypropylene (PP) spunbond behaves similarly in only having a slight impact on MVTR. Adding meltblown polypropylene (PP) inner layers to the two top and bottom outer layers appears to give a slight increase in the measured MVTR values of up to 3% increase.

Meltblown polypropylene (PP) non-woven fabrics are even better than spunbond at allowing water vapour to pass through them and maintain the MVTR of the multi-layer insulation. In both cases, the mean pore pore size of between 1 and 10 μm allows passage of water vapour.

TABLE 4

In the multi-layer insulation samples shown, the top and bottom (outer) layers are a microperforated aluminised film and the inner air-open separating layers are again air-open materials and the MVTR is measured in g/m² · day.

| Inner separating layer | 0 layers | 1 layer | 2 layers | Pore size of inner separating layer (μm) |
|---|---|---|---|---|
| 40 g/m² PP spunbond | 850 | 925 | 705 | 5-10 |
| 21 g/m² PP meltblown | 850 | 824 | 805 | 2-5 |

Table 4 again demonstrates that multiple air-open inner separating layers can be used in multi-layer water permeable thermal insulation samples with water vapour permeable outer layers and have little impact on the water vapour permeability of the multi-layer water permeable thermal insulation as a whole.

Construction of a multi-layer insulation sample with air-closed continuous outer layers and air-open inner layers can give high vapour permeability combined with good thermal resistance in a way that closed inner layers such as foils or films cannot. However the air-closed outer layers are still a limiting factor to the water vapour permeability that can be achieved. The Applicant has found that multi-layer insulation composed entirely of air-open layers gives even higher water vapour permeability.

TABLE 5

MVTR (g/m² · day) of multi-layer insulation samples formed entirely or predominantly of air-open materials.

| Top (outer) layer | Bottom (outer) layer | Inner separating layer | MVTR (g/m² · day) - 1 inner separating layer | MVTR (g/m² · day) - 2 inner separating layers |
|---|---|---|---|---|
| 50 g/m² aluminised PP spunbond | 50 g/m² aluminised PP spunbond | 50 g/m² aluminised PP spunbond | 1937 | 1839 |
| Standard 70 g/m² PP spunbond | Standard 70 g/m² PP spunbond | Standard 70 g/m² PP spunbond | 1856 | 1717 |
| Standard 70 g/m² PP spunbond | Cellulosic film | Standard 70 g/m² PP spunbond | 1533 | 1318 |

Multi-layer insulation structures where one or both of the two outer layers is air-open material such as aluminised or standard spunbond or meltblown gives a large increase in water vapour permeability from 1717 to 1937 g/m²·day.

TABLE 6

Table 6 shows the thermal resistance, R (m² · K/W) of multi-layer insulation samples with a WEB UV25 breathable roofing underlay as the top (outer) layer, a bottom (outer) layer of cellulosic film coated with a gold reflective coating and adhesively laminated to a spunbond PP non-woven and layers of non-woven polyester wadding with a total thickness of 30 mm between the two outer layers. The thermal resistance of this insulation sample, with wadding but no other inner convection barrier layers was measured using a heat flow meter. Additional air-open inner convection barrier layers were then added, keeping the outer layers and the wadding constant, and the thermal resistance of the new insulation sample measured. All thermal tests were carried out with a 25 mm unventilated still air space above and below the sample.

| Type of inner layer | Emissivity of inner separating layers | 0 layers | 1 layer | 2 layers | Pore size of inner separating layer (µm) |
|---|---|---|---|---|---|
| 15 g/m² PP spunbond | 0.60/0.65 | 1.31 | 1.34 | 1.36 | 10-20 |
| 40 g/m² PP spunbond white | 0.59/0.63 | 1.31 | 1.33 | 1.36 | 5-10 |
| 70 g/m² PP spunbond grey | 0.60/0.66 | 1.31 | 1.33 | 1.35 | 3-10 |
| 35 g/m² aluminised PP spunbond | 0.44/0.58 | 1.31 | 1.37 | 1.42 | 5-10 |
| 50 g/m² aluminised PP spunbond | 0.38/0.43 | 1.34 | 1.42 | 1.47 | 5-10 |
| 10 g/m² meltblown PP white | | 1.34 | 1.36 | 1.37 | 2-5 |
| 21 g/m² meltblown PP white | 0.60/0.62 | 1.34 | 1.39 | 1.42 | 2-5 |
| 70 g/m² calendered meltblown PP white | 0.46/0.59 | 1.34 | 1.43 | 1.44 | 1-5 |
| 21 g/m² aluminised PP meltblown | 0.80/0.45 | 1.34 | 1.43 | 1.48 | 2-5 |
| 70 g/m² aluminised PP meltblown | 0.80/0.43 | 1.34 | 1.46 | 1.52 | 1-5 |

Standard PP spunbonds with high emissivity surfaces have a modest but significant effect upon thermal resistance, increasing the R value when the number of inner layers is increased, in the examples of Table 6, from 1.31 to 1.36 m²·K/W. This improvement is due entirely to inhibition of air movement, i.e. reduced convection.

Aluminised spunbond gives a further improvement in R value to 1.42 and 1.47 m²·K/W. This improvement is due to both inhibition of air movement and radiation losses. Thus, it is possible to gain significant improvements in the thermal resistance of a multi-layer insulation by the use of air-open materials without a corresponding reduction in moisture vapour permeability. Even greater improvements in thermal resistance are achieved by the use of low-emissivity air-open materials which similarly show none, or very small, reductions in moisture vapour permeability.

The outer layers of the insulation samples in Table 6 are all watertight, and therefore the multi-layer insulation may be fitted on top of the rafters of a roof and beneath the outer roof covering of tiles or slates. In this case, the watertight top (outer) layer of the multi-layer insulation prevents wind-blown water or snow that passes through the outer roof covering from penetrating the multi-layer insulation. Examples of a suitable breathable but watertight top (outer) layer include cellulosic films, microporous PP films, laminates made of these films with non-woven materials, including adhesive lamination of cellulosic film to a suitable non-woven substrate, and thermal lamination of a microporous PP film to one or two non-woven PP spunbond fabrics, and other watertight non-woven materials made from water-repellent meltblown laminates such as those sold under the trade mark Roofshield™ manufactured by Don & Low Ltd, or flash-spun polyethylene non-woven materials such as those sold under the trade marks Tyvek™ and Enercor™ manufactured by DuPont Ltd.

TABLE 7

Despite being highly water vapour permeable, the Applicant has found that air-open, open or discontinuous, materials such as woven or non-woven fabrics can also be used as the outer layers and still provide a good thermal resistance as will be apparent from Table 7. The thermal resistance R in m² · K/W of various multi-layer water vapour permeable thermal insulation samples was measured using a heat flow meter as before. Each multi-layer water vapour permeable thermal insulation sample consisted of 30 mm of non-woven polyester wadding. The top and bottom (outer) layers and innner air-open separating layers were varied as shown in Table 7. Spacers were again in position above and below the insulation as a whole to create unventilated 25 mm still air spaces adjacent to both sides of the test sample.

| Example | Outer layers (emissivity of surfaces) | Inner separating layers (emissivity of surfaces) | 0 inner separating layers | 2 inner separating layers |
|---|---|---|---|---|
| 1 | None | None | 0.88 | NT |
| 2 | Gold coated cellulosic film (0.16/0.90) | Gold coated cellulosic film (0.16/0.90) | 1.22 | NT |
| 3 | 50 g/m² aluminised PP spunbond (0.38/0.43) | 50 g/m² aluminised PP spunbond (0.38/0.43) | 1.21 | 1.37 |
| 4 | 40 g/m² meltblown PP (0.60/0.62) | 40 g/m² meltblown PP (0.60/0.62) | 1.09 | 1.24 |

Example 1 in Table 7 consists only of 30 mm polyester wadding as an inner spacer layer. This structure has a thermal resistance, R of 0.88 m²·K/W.

Example 2 has an air-closed gold coated cellulosic film above and below the wadding of the inner spacer layer, increasing the thermal resistance to 1.22 m²·K/W. This increase is caused by two effects—the air-closed film prevents air movement through the wadding and into the adjacent air spaces, and the low emissivity gold surface reduces emission of radiation from the sample.

Example 3 shows the wadding with a 50 g/m² aluminised PP spunbond above and below the wadding of the inner spacer layer. This multi-layer insulation sample gives a thermal resistance, R of 1.21 m²·K/W, almost the same as the sample with the gold coated cellulosic films. The aluminised PP spunbond works in a similar way to the film in increasing the thermal resistance of the structure—by reducing air movement into and out of the wadding, and by reducing emission of radiation. It is surprising that a nominally air-open material such as a spunbond is able to restrict mass air movement to approximately the same extent as a closed film.

Example 4 shows the wadding with a 40 g/m² meltblown PP above and below the wadding of the inner spacer layer. This multi-layer insulation sample gives a thermal resistance, R of 1.09 m²·K/W, a significant improvement on the wadding alone, but not as good as Examples 2 and 3. Since the meltblown PP is not aluminised and has a high emissivity surface, the increase in thermal resistance is due solely to the effect of restricting air movement. Again, it is surprising that a nominally air-open material such as a spunbond is able to restrict mass air movement.

In Examples 3 and 4 the outer layers are not watertight. In many applications this will not cause any problems, for example when the multi-layer thermal insulation is used below an installed watertight layer, such as a roofing underlay, plywood sheathing or metal covering.

Various modifications maybe made without departing from the scope of the invention as defined in the appended claims. For example, whilst specific preferred materials have been mentioned, it should be understood that other suitable materials consistent with fulfilling the objects of the invention alternatively may be used.

The invention claimed is:

1. A water vapor permeable multi-layer thermal insulation including two water vapor permeable outer layers encapsulating inner air and water vapor permeable layers of insulation material and at least one inner separating layer of an air-open fibrous material interleaved with the inner insulation layers and having a mean flow pore size that allows water vapor to move from one side of the at least one inner fibrous separating layer to the other and through the inner insulation layers yet restricts mass movement of air from one side to the other of the at least one inner fibrous separating layer to form a barrier to convection, the multi-layer thermal insulation having a moisture vapor transmission rate (MTVR) of at least 1,200 g/m²·day and a thermal resistance (R) of at least 1.40 m²·K/W.

2. Multi-layer thermal insulation as claimed in claim 1, wherein the at least one inner fibrous separating layer has a mean flow pore size in the range of 1 to 20 µm to allow water vapor to move from one side of the or each inner fibrous separating layer to the other yet restrict mass movement of air from one side to the other of the at least one inner fibrous separating layer to form a barrier to convection.

3. Multi-layer thermal insulation as claimed in claim 2, wherein the mean flow pore size is 1 to 5 µm.

4. Multi-layer thermal insulation as claimed in claim 1, wherein the or each inner fibrous separating layer has a surface with an emissivity value in the range of from 0.05 to 0.5 that is provided on one or both sides thereof.

5. Multi-layer thermal insulation as claimed in claim 4, wherein the or each surface is provided by a reflective metallized coating that coats the fibers of the or each inner layer without blocking the pores between the fibers.

6. Multi-layer thermal insulation as claimed in claim 1, wherein the fibrous material of the or each inner fibrous separating layer is a woven or non-woven fabric.

7. Multi-layer thermal insulation as claimed in claim 6, wherein the fibrous material comprises a non-woven fabric selected from one or more of a spunbond, meltblown or wet-laid fabric.

8. Multi-layer thermal insulation as claimed in claim 1, wherein the inner insulation layers are of a fibrous material of low thermal conductivity and in the form of a wadding having fibers that range in diameter from 0.5 to 20 µm and having a density in the range 15 to 33 kg/m³.

9. Multi-layer thermal insulation as claimed in claim 8, and being of 50 mm thickness or less.

10. Multi-layer thermal insulation as claimed in claim 1, wherein the or each of the water vapor permeable outer layers has a surface with an emissivity value in the range of from 0.05 to 0.5 that is provided on one or both sides of the or each water vapor permeable outer layer.

11. Multi-layer thermal insulation as claimed in claim 10, wherein the surface is provided by a reflective substance.

12. Multi-layer thermal insulation as claimed in claim 1, wherein the or each of the water vapor permeable outer layers is air permeable.

13. Multi-layer thermal insulation as claimed in claim 1, wherein the or each of the water vapor permeable outer layers is air impermeable.

14. Multi-layer thermal insulation as claimed in claim 1, wherein the or each of the water vapor permeable outer layers is air and liquid water impermeable.

15. Multi-layer thermal insulation as claimed in claim 1, wherein the or each of the water vapor permeable outer layers are air permeable and are selected from spunbond fabrics, meltblown fabrics, or combinations of spunbond and meltblown fabrics, including spunbond-meltblown fabrics, spunbond-meltblown-spunbond fabrics, and spunbond-meltblown-meltblown-spunbond fabrics.

16. Multi-layer thermal insulation as claimed in claim 1, wherein the or each of the water vapor permeable outer layers are selected from micro-perforated films, microperforated foils, microporous polypropylene (PP), microporus polyurethane, microporus polyester, microporus polyethylene, and cellulosic films and laminates thereof.

17. Multi-layer thermal insulation as claimed in claim 1, wherein one of the water vapor permeable outer layers is a microporous film sandwiched between two air-open non-woven fabric layers and the other of the water vapor permeable outer layers is a reflective cellulosic film laminated to an air-open non-woven fabric layer.

18. Multi-layer thermal insulation as claimed in claim 1, and having an MVTR in the range of 1,200 to 2,500 g/m²·day.

19. Multi-layer thermal insulation as claimed in claim 1, and having an R value in the range of 1.40 to 2.00 m²·K/W.

20. Multi-layer thermal insulation as claimed in claim 2, wherein the mean flow pore size is 2 to 10 µm.

21. Multi-layer thermal insulation as claimed in claim 2 wherein the mean flow pore size is 5 to 10 µm.

22. A water vapor permeable multi-layer thermal insulation including two water vapor permeable outer layers encapsulating air and water vapor permeable inner layers of insulation material and at least one inner separating layer of an air-open fibrous material interleaved with the inner insulation layers and having a mean flow pore size in the range of 1 to 20 µm that allows water vapor to move from one side of the at least one inner fibrous separating layer to the other and through the inner insulation layers, yet restricts mass movement of air from one side to the other of the at least one inner fibrous separating layer to form a barrier to convection, the multi-layer thermal insulation having a moisture vapor transmission rate (MTVR) of at least 1,200 g/m$^2$·day and thermal resistance (R) of at least 1.40 m$^2$·K/W.

23. A water vapor permeable multi-layer thermal insulation including two water vapor permeable outer layers encapsulating air and water vapor permeable inner layers of insulation material and at least one inner separating layer of an air-open fibrous material interleaved with the inner insulation layers and having a mean flow pore size in the range of 1 to 20 μm that allows water vapor to move from one side of the at least one inner fibrous separating layer to the other and through the inner insulation layers, yet restricts mass movement of air from one side to the other of the at least one inner fibrous separating layer to form a barrier to convection, the or each inner fibrous separating layer having a surface with an emissivity value in the range of from 0.05 to 0.5 that is provided on one or both sides thereof by a reflective metallized coating that coats the fibers of the or each inner fibrous separating layer without blocking the pores between the fibers and the multi-layer thermal insulation having a moisture vapor transmission rate (MTVR) of at least 1,200 g/m$^2$·day and thermal resistance (R) of at least 1.40 m$^2$·K/W.

* * * * *